(12) United States Patent
Hanusch et al.

(10) Patent No.: US 9,584,634 B2
(45) Date of Patent: Feb. 28, 2017

(54) ADAPTIVE ACKNOWLEDGMENT TRANSMISSIONS

(71) Applicant: Atmel Corporation, San Jose, CA (US)

(72) Inventors: Thomas Hanusch, Coswig (DE); Udo Walter, Dresden (DE); Claudia Engel, Dresden (DE)

(73) Assignee: Atmel Corporation, San Jose, CA (US)

( * ) Notice: Subject to any disclaimer, the term of this patent is extended or adjusted under 35 U.S.C. 154(b) by 140 days.

(21) Appl. No.: 14/529,973

(22) Filed: Oct. 31, 2014

(65) Prior Publication Data

US 2016/0127519 A1    May 5, 2016

(51) Int. Cl.

| | |
|---|---|
| *H04L 12/26* | (2006.01) |
| *H04L 29/06* | (2006.01) |
| *H04L 5/00* | (2006.01) |
| *H04W 4/00* | (2009.01) |
| *H04L 29/08* | (2006.01) |

(52) U.S. Cl.
CPC ............ *H04L 69/22* (2013.01); *H04L 5/0055* (2013.01); *H04W 4/001* (2013.01); *H04L 69/323* (2013.01); *H04L 69/324* (2013.01)

(58) Field of Classification Search
CPC ..... H04L 69/22; H04L 5/0055; H04L 1/1819; H04W 26/22
USPC ........................................................ 370/252
See application file for complete search history.

(56) References Cited

U.S. PATENT DOCUMENTS

| 7,864,678 B1* | 1/2011 | Sampath | H04W 28/22 370/232 |
|---|---|---|---|
| 2004/0042492 A1* | 3/2004 | Suzuki | H04B 7/2643 370/473 |
| 2008/0137585 A1* | 6/2008 | Loyola | H04B 7/15521 370/315 |
| 2009/0116544 A1* | 5/2009 | Zhang | H04L 1/0003 375/227 |

OTHER PUBLICATIONS

IEEE, "IEEE Standard for Local and metropolitan area networks—Part 15.4: Low-Rate Wireless Personal Area Networks (LR-WPANs)," IEEE Std 802.15.4-2011, Sep. 2001.

(Continued)

*Primary Examiner* — Sai-Ming Chan
(74) *Attorney, Agent, or Firm* — Fish & Richardson P.C.

(57) ABSTRACT

Systems and techniques for adaptive automatic acknowledgment handling are described. A described system includes a memory structure to store a data rate (DR) adaptation mode indicator, a frame check sequence (FCS) adaptation mode indicator, a preset DR parameter, and a preset FCS parameter; an extractor to extract a DR parameter from a received frame to produce an extracted DR parameter and extract a FCS parameter from the received frame to produce an extracted FCS parameter; a selector to select between the preset DR parameter and the extracted DR parameter based on the DR adaptation mode indicator to produce a selected DR parameter and select between the preset FCS parameter and the extracted FCS parameter based on the FCS adaptation mode indicator to produce a selected FCS parameter; and a generator to generate an acknowledgment to the received frame based on the selected DR parameter and the selected FCS parameter.

20 Claims, 7 Drawing Sheets

(56) References Cited

OTHER PUBLICATIONS

IEEE, "IEEE Standard for Local and metropolitan area networks—Part 15.4: Low-Rate Wireless Personal Area Networks (LR-WPANs) Amendment 3: Physical Layer (PHY) Specifications for Low-Data-Rate, Wireless, Smart Metering Utility Networks," IEEE Std 802.15.4g-2012, Apr. 2012.

ETSI, "Electromagnetic compatibility and Radio spectrum Matters (ERM); Short Range Devices; Smart Metering Wireless Access Protocol; Part 1: PHY layer," ETSI TS 102 887-1 V1.1.1 (Jul. 2013), 2013.

\* cited by examiner

ADAPTIVE ACKNOWLEDGMENT TRANSMISSIONS

TECHNICAL FIELD

This patent document relates generally to acknowledgment transmissions.

BACKGROUND

Various wireless communication standards describe protocols for data frame transmissions and acknowledgment frame transmissions. Upon receipt of a data frame, an acknowledgment frame is generated and transmitted. In some protocols, an acknowledgment frame is generated and transmitted if the received data frame was successfully received. A wireless communication standard can specify communication parameters for transmissions. For example, a standard can specify one or more modulation schemes, one or more coding schemes, or both.

SUMMARY

This document describes, among other things, technologies relating to automatic and adaptive acknowledgment frame transmissions. In one aspect, a described device can include a memory structure configured to store a data rate adaptation mode indicator, a frame check sequence adaptation mode indicator, a preset data rate parameter, and a preset frame check sequence parameter; an extractor configured to extract a data rate parameter from a received frame to produce an extracted data rate parameter and extract a frame check sequence parameter from the received frame to produce an extracted frame check sequence parameter; a selector configured to select between the preset data rate parameter and the extracted data rate parameter based on the data rate adaptation mode indicator to produce a selected data rate parameter and select between the preset frame check sequence parameter and the extracted frame check sequence parameter based on the frame check sequence adaptation mode indicator to produce a selected frame check sequence parameter; and a generator configured to generate an acknowledgment to the received frame based on the selected data rate parameter and the selected frame check sequence parameter.

This and other implementations can include one or more of the following features. Implementations can include a frame validator configured to validate the received frame based on a frame check sequence included in the received frame. In some implementations, the generator is configured to generate the acknowledgement based on a successful validation of the received frame. In some implementations, the memory structure is configured to store an automatic acknowledgment mode indicator configured to enable or disable an automatic acknowledgment mode. The generator can be configured to generate the acknowledgment if the automatic acknowledgment mode is enabled. Implementations can include an interface to couple with a controller configured to perform processing for a medium access control (MAC) layer. The generator can be configured to generate the acknowledgment independently from the MAC layer. In some implementations, the preset data rate parameter can include two or more parameters. In some implementations, the preset data rate parameter can include a modulation and coding scheme (MCS) index value. In some implementations, the extracted data rate parameter is based on a MCS index value included in the received frame.

In another aspect, a system can include a radio unit, a memory structure, and a baseband unit. The radio unit can include a receiver and a transmitter, the receiver being configured to produce a received frame from one or more signals. The memory structure can store one or more of: a data rate adaptation mode indicator, a frame check sequence adaptation mode indicator, a preset data rate parameter, and a preset frame check sequence parameter. The baseband unit can be configured to extract a data rate parameter from a received frame to produce an extracted data rate parameter, extract a frame check sequence parameter from the received frame to produce an extracted frame check sequence parameter, or both. The baseband unit can configured to select between the preset data rate parameter and the extracted data rate parameter based on the data rate adaptation mode indicator to produce a selected data rate parameter, select between the preset frame check sequence parameter and the extracted frame check sequence parameter based on the frame check sequence adaptation mode indicator to produce a selected frame check sequence parameter, or both. The baseband unit can be configured to generate an acknowledgment to the received frame based on the selected data rate parameter, the selected frame check sequence parameter, or both. The transmitter can be configured to transmit the acknowledgment.

This and other implementations can include one or more of the following features. The baseband unit can be configured to validate the received frame based on a frame check sequence included in the received frame. The baseband unit can be configured to generate the acknowledgment based on a successful validation of the received frame. In some implementations, the memory structure is configured to store an automatic acknowledgment mode indicator configured to enable or disable an automatic acknowledgment mode. The baseband unit can be configured to generate the acknowledgment if the automatic acknowledgment mode is enabled. Implementations can include a controller configured to perform processing for a MAC layer. The baseband unit can be configured to generate the acknowledgment independently from the MAC layer. In some implementations, the preset data rate parameter can include two or more parameters. In some implementations, the preset data rate parameter can include a MCS index value. In some implementations, the extracted data rate parameter is based on a MCS index value included in the received frame. The baseband unit can include one or more processors, specialized logic circuitry, or both.

In another aspect, a described technique can include receiving a frame over a wireless communication channel from a device, extracting a data rate parameter from the received frame, extracting a frame check sequence parameter from the received frame, selecting between a preset data rate parameter and the extracted data rate parameter based on a data rate adaptation mode indicator to produce a selected data rate parameter, selecting between a preset frame check sequence parameter and the extracted frame check sequence parameter based on a frame check sequence adaptation mode indicator to produce a selected frame check sequence parameter, selectively generating an acknowledgment to the received frame based on the selected data rate parameter and the selected frame check sequence parameter; and transmitting the acknowledgment to the device.

This and other implementations can include one or more of the following features. Implementations can include validating the received frame based on a frame check sequence included in the received frame. Generating the acknowledgment can be based on a successful validation of the received frame. Implementations can include accessing an automatic acknowledgment mode indicator configured to enable or disable an automatic acknowledgment mode. Generating the acknowledgement can include generating the acknowledgment in response to determining that the automatic acknowledgment mode is enabled. Implementations can include forwarding a version of the received frame to a MAC layer. Generating the acknowledgment can include generating the acknowledgment independently from the MAC layer. In some implementations, the preset data rate parameter includes two or more parameters. In some implementations, the preset data rate parameter includes a MCS index value. The extracted data rate parameter can be based on a MCS index value included in the received frame.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
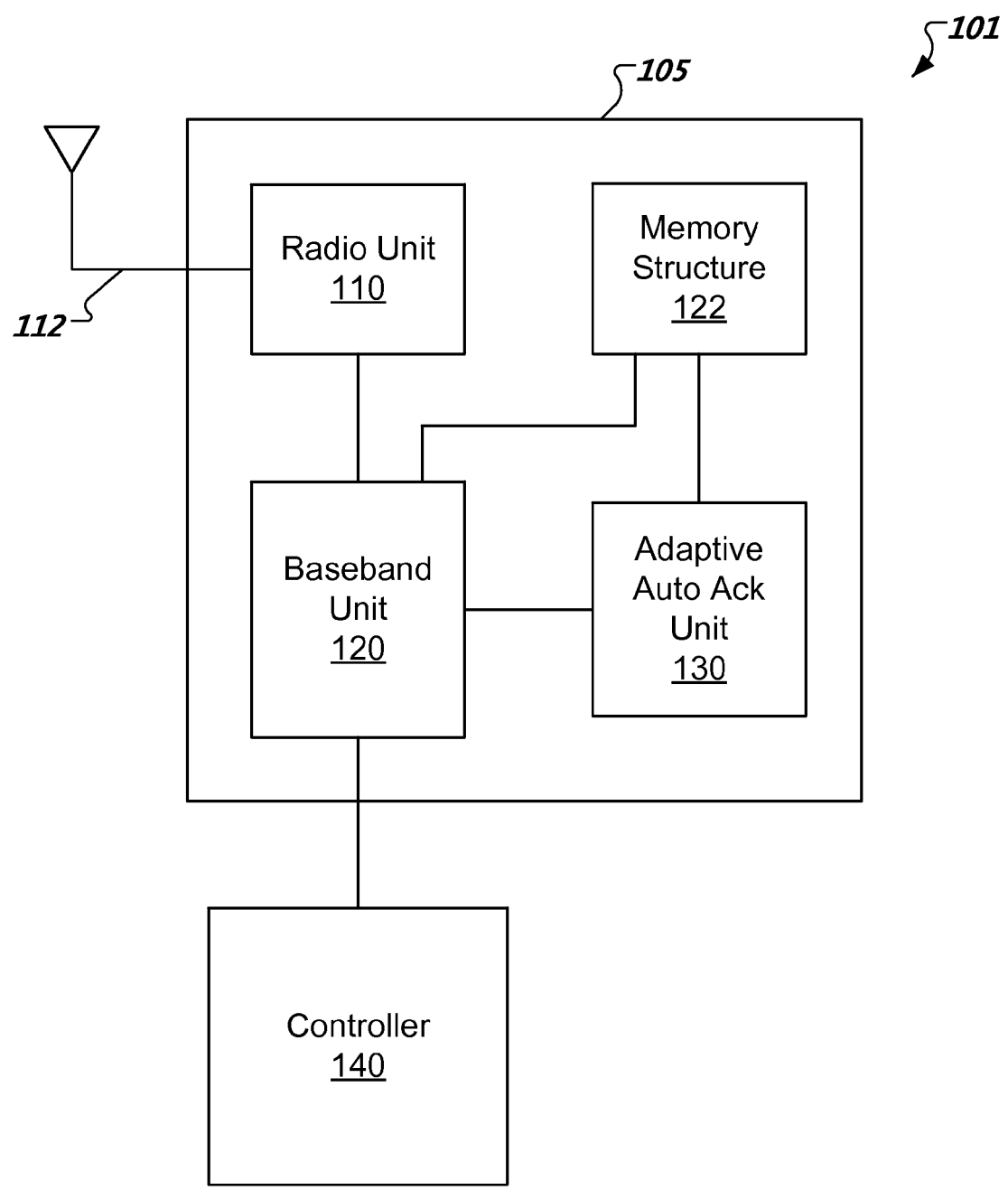
FIG. 1 shows a simplified architecture of an example of a wireless communication device that includes an adaptive automatic acknowledgment unit.

FIG. 1 shows a simplified architecture of an example of a wireless communication device 101 that includes an adaptive automatic acknowledgment unit 130. The device 101 can include a transceiver 105 and a controller 140. The transceiver 105 can include a radio unit 110, a baseband unit 120, memory structure 122, and an adaptive automatic acknowledgment unit 130. The controller 140 of the device 101 can be configured to operate the transceiver 105. In some implementations, the controller 140 is configured to perform MAC layer processing. The controller 140 can provide data to the transceiver 105 for transmission and receive data from the transceiver 105. The baseband unit 120 can be configured to perform physical (PHY) layer processing.

The radio unit 110 can be configured to transmit and receive signals via one or more antennas 112. The radio unit 110 can include receiver circuitry such as a low noise amplifier (LNA), mixer, frequency synthesizer, band pass filter (BPF), analog-to-digital convert (ADC), downconverter, and automatic gain control. The radio unit 110 can include transmitter circuitry such a power amplifier (PA), mixer, frequency synthesizer, low pass filter (LPF), digital-to-analog converter (DAC), and upconverter. The radio unit 110 can provide digitized samples of a received signal to the baseband unit 120. Further, the radio unit 110 can receive digital samples of a transmit signal from the baseband unit 120 and transmit a signal based on the received digital samples.

The baseband unit 120 can be configured for PHY layer processing such as modulating, demodulating, encoding, decoding, interleaving, deinterleaving, and error processing. In some implementations, the baseband unit 120 can perform one or more modulation schemes such as frequency-shift keying (FSK), orthogonal frequency division multiplexing (OFDM), or offset quadrature phase-shift keying (OQPSK), among others. In some implementations, the baseband unit 120 can generate PHY frames based on transmit data provided by the controller 140, and forward the PHY frames to the radio unit 110 for transmission. In some implementations, the baseband unit 120 can obtain samples representing a PHY received frame from the radio unit 110 that are produced in response to a received signal. The baseband unit 120 can process a PHY received frame and provide received data to the controller 140. In some implementations, the baseband unit 120 includes an interface, such as a serial peripheral interface (SPI), Inter-Integrated Circuit (I2C) interface, or parallel interface, to couple with the controller 140. In some implementations, the baseband unit 120 includes one or more processors.

In response to receiving a frame at the transceiver 105, the adaptive automatic acknowledgment unit 130 can generate an acknowledgment to the received frame and cause the acknowledgment to be transmitted via the radio unit 110. In some implementations, if an automatic acknowledgment mode is enabled, the adaptive automatic acknowledgment unit 130 can generate acknowledgments independently from the controller 140, e.g., the controller 140 is alleviated from frame-to-frame acknowledgment generation. If the automatic acknowledgment mode is disabled, the adaptive automatic acknowledgment unit 130 defers frame-to-frame acknowledgment generation to the controller 140.

The adaptive automatic acknowledgment unit 130 can generate an acknowledgment based on an adaptive acknowledgment mode indicator. If the adaptive acknowledgment mode is enabled, the adaptive automatic acknowledgment unit 130 can generate an acknowledgment using communication parameters extracted from a received frame. If the adaptive acknowledgment mode is disabled, the adaptive automatic acknowledgment unit 130 can generate an acknowledgment using one or more preset communication parameters that are stored in the memory structure 122. In some implementations, the adaptive automatic acknowledgment unit 130 can generate an acknowledgment using both preset and extracted communication parameters. In some implementations, the adaptive automatic acknowledgment unit 130 can include one or more processors.

The memory structure 122 can store information such an automatic acknowledgment mode indicator, adaptive acknowledgment mode indicator, and communication parameters such as a modulation scheme parameter or an error check parameter such as a frame check sequence (FCS) type. One or more of the communication parameters can control a data rate of a transmitted frame such as a data frame, control frame, or an acknowledgment frame.

In some implementations, the memory structure 122 contains one or more non-volatile registers that are configured to store one or more parameters. In some implementations, a manufacturing process can include programming one or more parameters within the memory structure 122. In some implementations, the memory structure 122 is a volatile memory. In some implementations, the controller 140 writes one or more parameters to the memory structure 122 after each power cycle or reset. In some implementations, the memory structure 122 can be accessed, either for writes or reads, via an interface such as a SPI bus.

In some implementations, the baseband unit 120 includes the memory structure 122. In some implementations, the baseband unit 120 includes the adaptive automatic acknowledgment unit 130. In some implementations, the transceiver 105 is a single integrated circuit. In some implementations, the transceiver 105 includes multiple integrated circuits. In some implementations, the wireless communication device 101 can include one or more general purpose processors, a field programmable gate array (FPGA), an application specific integrated circuit (ASIC), digital signal processor (DSP), or a combination thereof. In some implementations, the wireless communication device 101 can be configured to support communication standards such as IEEE 802.15.4, IEEE 802.15.4g, or ETSI TS 102 887. Other types of standards are possible.

Figure 2:
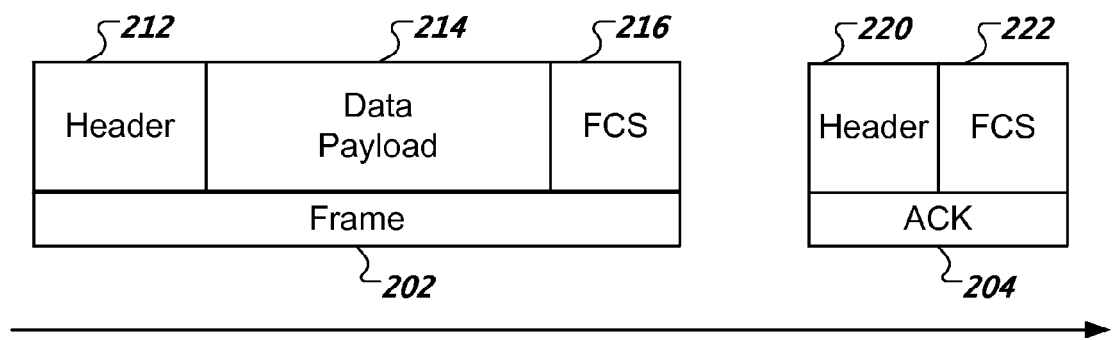
FIG. 2 shows a timing diagram of an example of a communication exchange.

FIG. 2 shows a timing diagram of an example of a communication exchange. A transmitting device can transmit a frame 202 to a receiving device. In response to the frame 202, the receiving device can transmit an acknowledgment 204. The frame 202 can include a header 212, data payload 214, and FCS 216. In some implementations, the header 212 can include a data rate field that specifies a data rate of the frame 202. In some implementations, the header 212 can include a MCS index value. In some implementations, different MCS index values can correspond to different data rates. In some implementations, a specific data rate can be inferred by a MCS index value and additional information such as a bandwidth configuration. In some implementations, the header 212 can include a PHY mode identifier, which can be associated with a specific data rate used for the frame 202. The FCS 216 can be used to detect receive errors within the frame 202. In some implementations, the FCS 216 includes bit-values that are generated as a function of the header 212 and the data payload 214. In some implementations, the header 212 can include a FCS type field that indicates a length of the FCS 216. In some implementations, a FCS type field can indicate one of two or more FCS length options such as 8-bits, 16-bits, or 32-bits. Based on validating the frame 202 using the FCS 216, the receiving device can generate and transmit an acknowledgment 204. The acknowledgment 204 can include a header 220 and a FCS 222. In some implementations, the header 220 of the acknowledgment 204 can include a data rate indication, FCS type indication, or both. Other formats of the frame 202 and the acknowledgment 204 are possible.

Figure 3:
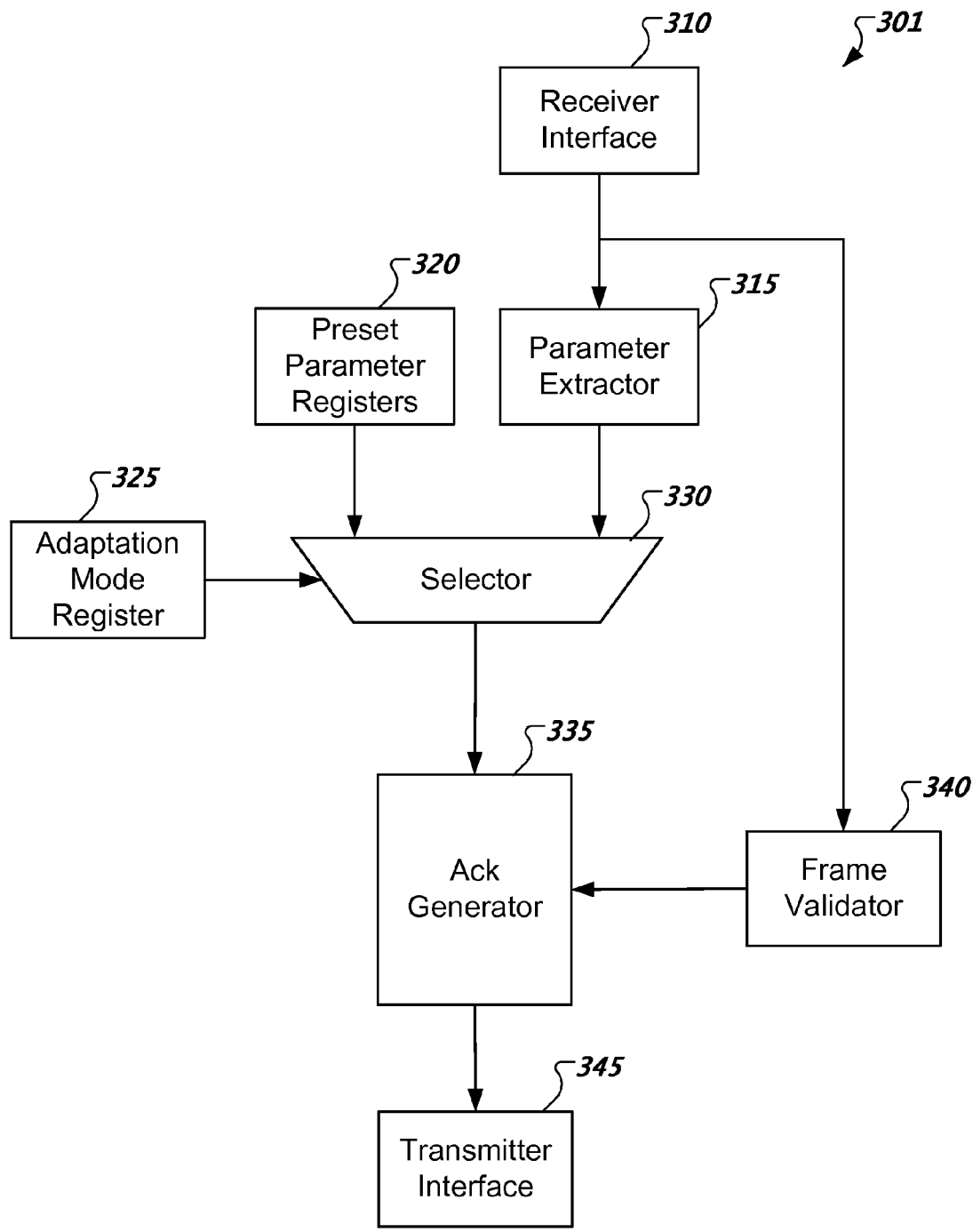
FIG. 3 shows a simplified architecture of an example of an adaptive automatic acknowledgment mechanism of a baseband unit.

FIG. 3 shows a simplified architecture of an example of an adaptive automatic acknowledgment mechanism of a baseband unit 301. The baseband unit 301 can include circuitry such as a receiver interface 310, parameter extractor 315, preset parameter registers 320, adaptation mode register 325, selector 330, acknowledgment generator 335, frame validator 340, and transmitter interface 345. The baseband unit 301 can support multiple PHY layer protocols, different transmission modes within a single protocol, or both.

A manufacturer may customize the baseband unit 301 based on a specific PHY layer protocol, specific manufacturing design options, or both. For example, the manufacturer may decide to customize the baseband unit 301 to generate acknowledgement transmissions based on an adaptation mode or a preset mode by programming an adaptation mode register 325. An indicator value stored in the adaptation mode register 325 can indicate whether acknowledgments are generated in accordance with the adaptation mode or the preset mode. In some implementations, the preset mode is implied if the adaptation mode is disabled. In the adaptation mode, the acknowledgment generator 335 uses communication parameters extracted from a received frame. In the preset mode, the acknowledgment generator 335 uses preset communication parameters that are stored in preset parameter registers 325. Various examples of communication parameters include a data rate parameter and FCS parameter. Other types of parameters are possible. In some implementations, a data rate parameter includes two or more parameters that, taken together, indicate a data rate.

The parameter extractor 315 can extract one or more communication parameters from a received frame obtained via the receiver interface 310. In some implementations, parameter extractor 315 extracts parameters from one or more fields in a header of the received frame. In some implementations, parameter extractor 315 extracts parameters based on analyzing a preamble of the received frame.

In some implementations, the preset parameter registers 325 can be changed before, during, or after operations associated with the baseband unit 301. For example, a controller that is external to the baseband unit 301 can program the preset parameter registers 320 with communication parameters for acknowledgments. Parameters such as a FCS parameter or a data rate parameter can be written respectively to the preset parameter registers 320 before the baseband unit 301 starts to receive communication signals.

Based on the adaptation mode register 325, the selector 330 selects communication parameters from the preset parameter registers 320 or the parameter extractor 315. In some implementations, the adaptation mode register 325 can include multiple indicator values that specify adaptation modes on a per-parameter basis. In some implementations, the selector 330 can select one or more communication parameters from the preset parameter registers 320 and one or more different communication parameters from the parameter extractor 315.

Using the communication parameters selected by the selector 330, the acknowledgment generator 335 generates an acknowledgment. In some implementations, an acknowledgment is generated only if an output of a frame validator 340 indicates that the received frame has been successfully received. The acknowledgment generator 335 can provide the acknowledgment to a transmitter interface 345. The transmitter interface 345 can be coupled with a transmitter of a radio unit.

Figure 4:
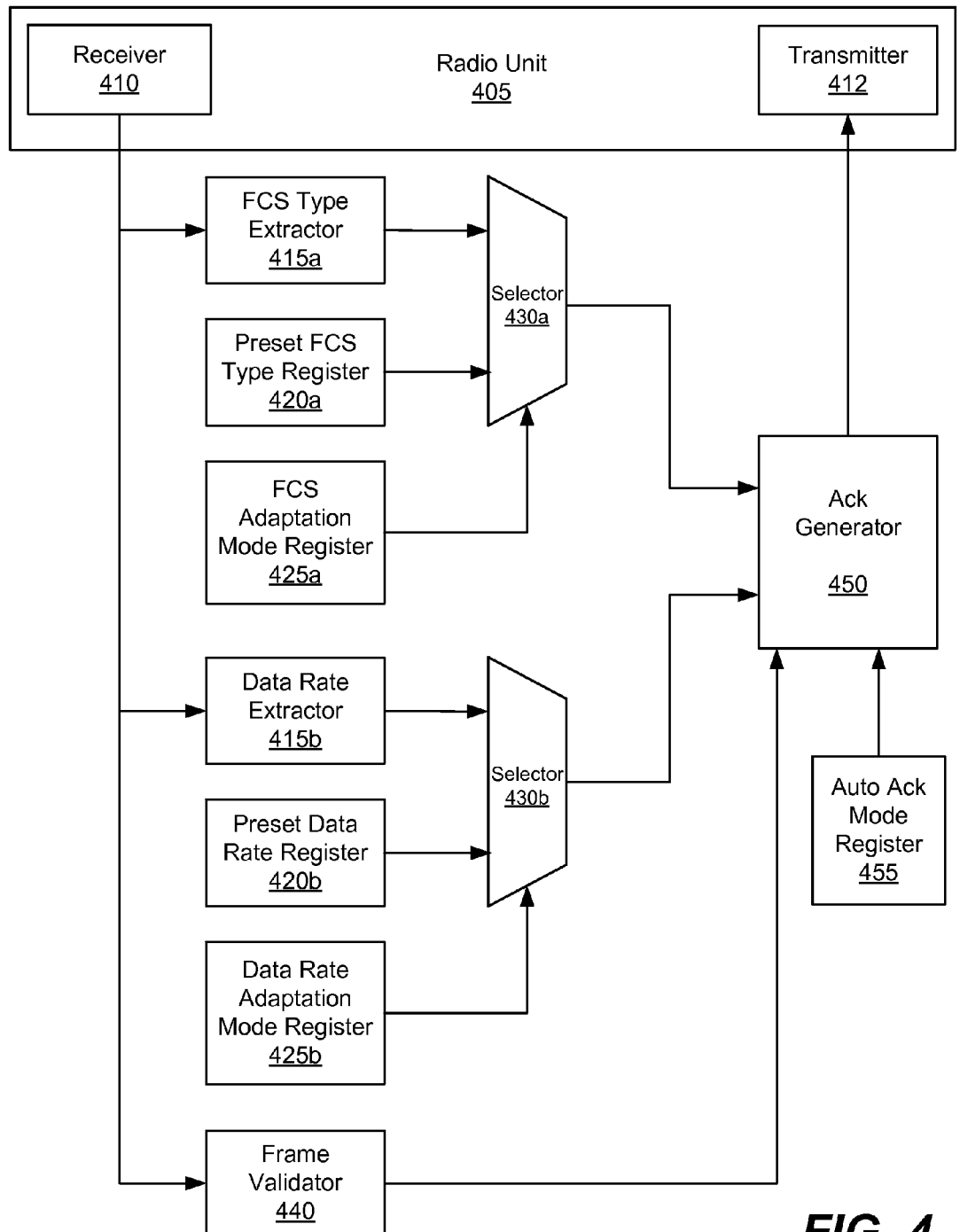
FIG. 4 shows another architecture of an example of a device having an adaptive automatic acknowledgment mechanism.

FIG. 4 shows another architecture of an example of a device 401 having an adaptive automatic acknowledgment mechanism. The device 401 can include a radio unit 405 containing a receiver 410 and a transmitter 412. For the adaptive automatic acknowledgment mechanism, the device 401 can include extractors 415a-b such as a FCS type extractor 415a and a data rate extractor 415b, preset parameter registers 420a-b such as a preset FCS type register 420a and a preset data rate register 420b, adaptation mode registers 425a-b such as a FCS adaptation mode register 425a and a data rate adaptation mode register 425b, selectors 430a-b such as a FCS selector 430a and a data rate selector 430b, frame validator 440, acknowledgment generator 450, and automatic acknowledgment mode register 455.

In response to receiving a signal that represents a frame, the receiver 410 can provide a received frame to the adaptive automatic acknowledgment mechanism of the device 401.

The acknowledgment generator 450 can generate an acknowledgment based on the received frame. In this example, acknowledgment generator 450 generates an acknowledgment based on outputs from the automatic acknowledgment mode register 455, frame validator 440, and selectors such as FCS selector 430a and data rate selector 430b. In some implementations, the acknowledgment can be based on other outputs such as a value of a bandwidth configuration option register. In some implementations, an acknowledgment is generated only if the received frame is valid. The frame validator 440 can determine whether the received frame is valid. In some implementations, the frame validator 440 can perform a checksum calculation on the received frame and compare the computed checksum with a checksum value included in the received frame, such as a FCS, to determine whether the checksum values match. The automatic acknowledgment mode register 455 can be set to either enable or disable the acknowledgment generator 450. If the acknowledgment generator 450 is enabled, then the acknowledgment generator 450 can generate acknowledgments without the involvement of higher layers such as a MAC layer. If the acknowledgment generator 450 is disabled, then the acknowledgment generator 450 does not generate acknowledgments, and a higher layer such as the MAC layer is responsible for generating acknowledgments. The acknowledgment generator 450 can generate an acknowledgment in accordance with communication parameters such as a FCS parameter provided by the FCS selector 430a and a data rate parameter provided by the data rate selector 430b.

The FCS type extractor 415a can extract a FCS parameter, e.g., FCS length type, from the received frame. The FCS type extractor 415a can provide the extracted FCS parameter to the FCS selector 430a. The preset FCS type register 420a can provide a preset FCS parameter, e.g., FCS length type, to the FCS selector 430a. Based on an output from the FCS adaptation mode register 425a, the FCS selector 430a can select between the preset FCS parameter and the extracted FCS parameter. In some implementations, if the FCS adaptation mode register 425a is set with an enabled indicator, then the extracted FCS parameter is selected. If the FCS adaptation mode register 425a is set with a disabled indicator, then the preset FCS parameter is selected.

The data rate extractor 415b can extract one or more data rate parameters from the received frame. The data rate extractor 415b can provide one or more extracted data rate parameters to the data rate selector 430b. The preset data rate register 420b can provide one or more preset data rate parameters to the data rate selector 430b. Based on an output from the data rate adaptation mode register 425b, the data rate selector 430b can select between the one or more preset data rate parameters and the one or more extracted data rate parameters. In some implementations, if the data rate adaptation mode register 425b is set with an enabled indicator, then the one or more extracted data rate parameters are selected. If the data rate adaptation mode register 425b is set with a disabled indicator, then the one or more preset data rate parameters are selected.

In some implementations, the preset data rate register 420b includes multiple registers that specify different data rate aspects. For example, the preset data rate register 420b can include a MCS register, bandwidth option register, or both. A MCS register can store a MCS index value which corresponds to a specific combination of a modulation type (e.g., BPSK, QPSK, or 16-QAM), coding rate, and frequency repetition. For OFDM, a bandwidth option register can provide information such as a nominal bandwidth, channel spacing, discrete Fourier transform (DFT) size, number of active tones, number of pilot tones, and number of data tones. In some implementations, the preset data rate register 420b can specify a chip rate and a rate mode. Different data rates can be achieved using different chip rates, rate modes, or both.

Figure 5:
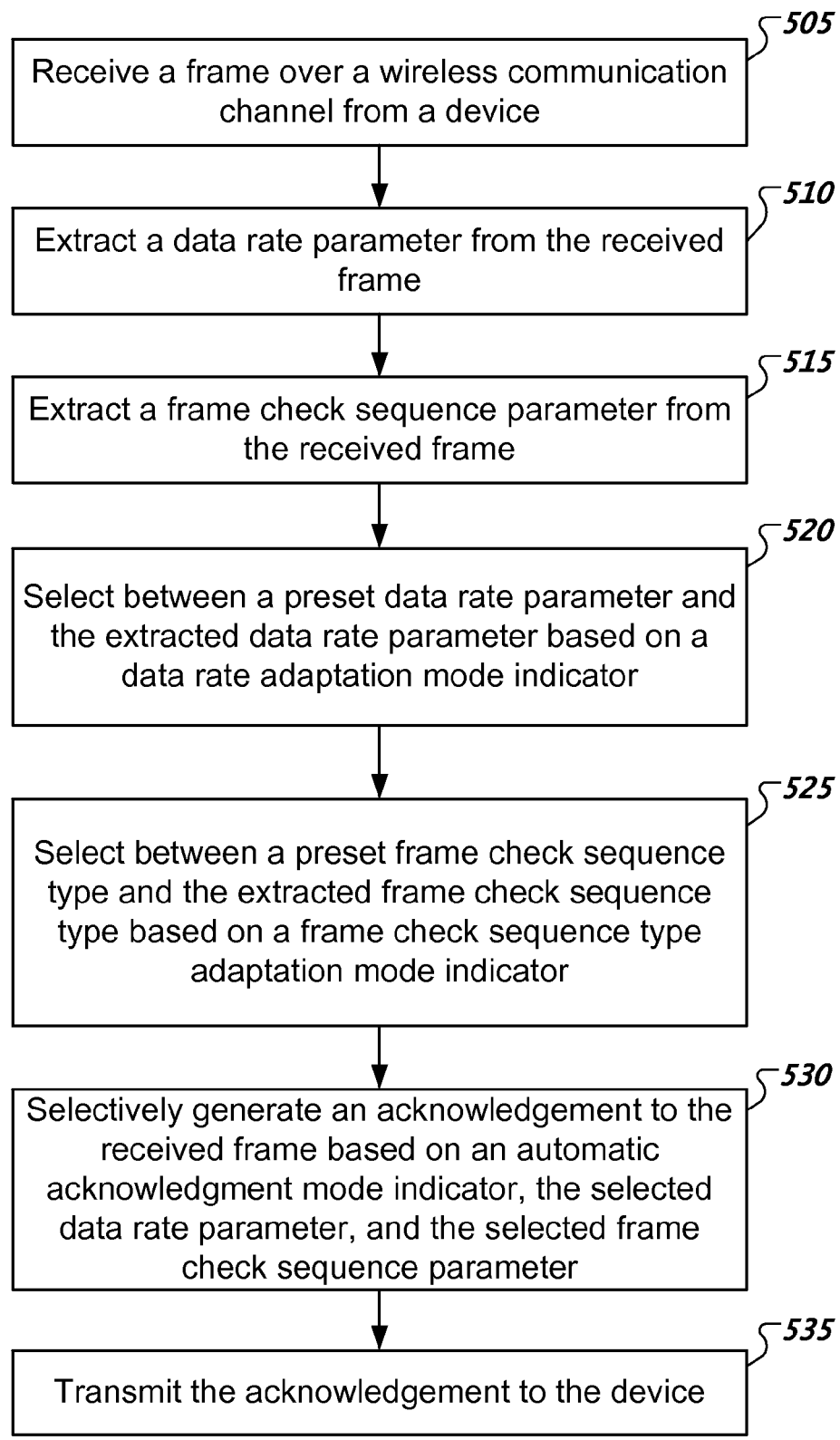
FIG. 5 shows a flowchart of an example of an adaptive automatic acknowledgment process.

FIG. 5 shows a flowchart of an example of an adaptive automatic acknowledgment process. At 505, the process receives a frame over a wireless communication channel from a device. At 510, the process extracts a data rate parameter from the received frame. In some implementations, extracting a data rate parameter can include extracting a MCS index value from a header in the received frame. At 515, the process extracts a frame check sequence parameter from the received frame. In some implementations, extracting a frame check sequence parameter can include extracting a frame check sequence type value from a header in the received frame.

At 520, the process selects between a preset data rate parameter and the extracted data rate parameter based on a data rate adaptation mode indicator. If a data rate adaptation mode is enabled, then the extracted data rate parameter is selected. In some implementations, the process accesses a preset data rate parameter such as a MCS index value from a register in a register bank. At 525, the process selects between a preset frame check sequence parameter and the extracted frame check sequence parameter based on a frame check sequence adaptation mode indicator. If a frame check sequence adaptation mode is enabled, then the extracted frame check sequence parameter is used.

At 530, the process selectively generates an acknowledgment to the received frame based on an automatic acknowledgment mode indicator, the selected data rate parameter, and the selected frame check sequence parameter. For example, the acknowledgment can be generated based on a successful validation of the received frame. In some implementations, the process can include validating the received frame based on a frame check sequence included in the received frame. In some implementations, the process can include accessing an automatic acknowledgment mode indicator configured to enable or disable an automatic acknowledgment mode. In some implementations, the acknowledgment is generated if the automatic acknowledgment mode is enabled and the received frame is successfully validated. At 535, the process transmits the acknowledgment to the device.

Figure 6:
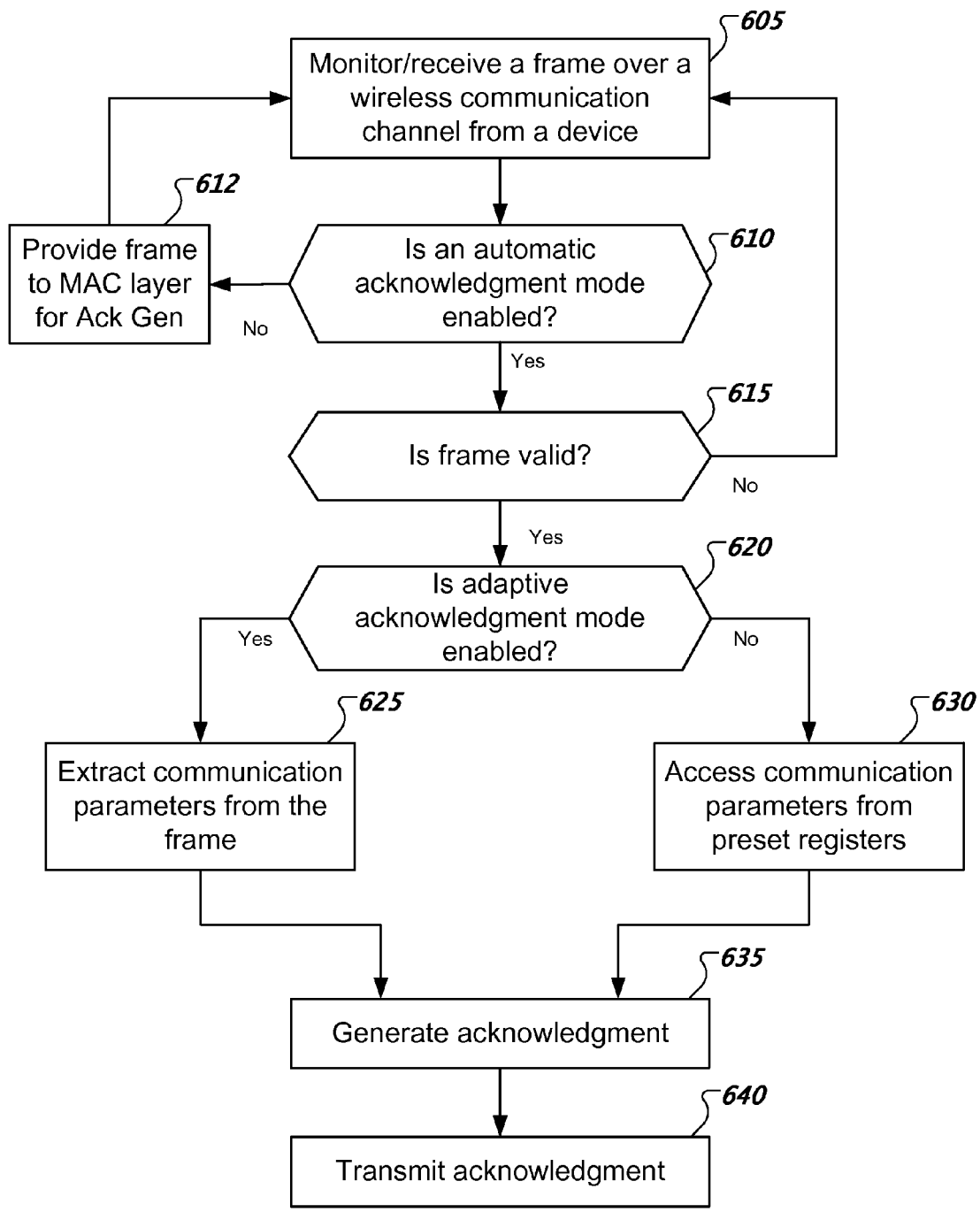
FIG. 6 shows a flowchart of an example of a physical layer adaptive automatic acknowledgment process.

FIG. 6 shows a flowchart of an example of a physical layer adaptive automatic acknowledgment process. At 605, the process monitors and receives a frame over a wireless communication channel from a device. At 610, the process determines whether an automatic acknowledgment mode is enabled. If the automatic acknowledgment mode is disabled, the process, at 612, provides the frame to a MAC layer for acknowledgment generation, and continues to monitor for frames at 605.

If the automatic acknowledgment mode is enabled, the process, at 615, determines whether the frame is valid. If the frame is not valid, the process returns to monitoring for frames at 605. If the frame is valid, then the process at 620, determines whether an adaptive acknowledgment mode is enabled. If the adaptive acknowledgment mode is enabled, then the process at 625 extracts communication parameters from the frame. In some implementations, the process can access one or more communication parameters from a register bank even though the adaptive acknowledgment mode is enabled. If the adaptive acknowledgment mode is disabled, then the process at 630 accesses communication parameters from preset registers. Based on extracting parameters, accessing preset parameters, or a combination thereof, the process at 635 generates an acknowledgment based on the parameters, e.g., extracted parameters, preset parameters, or a combination thereof. At 640, the process transmits the acknowledgment.

Figure 7:
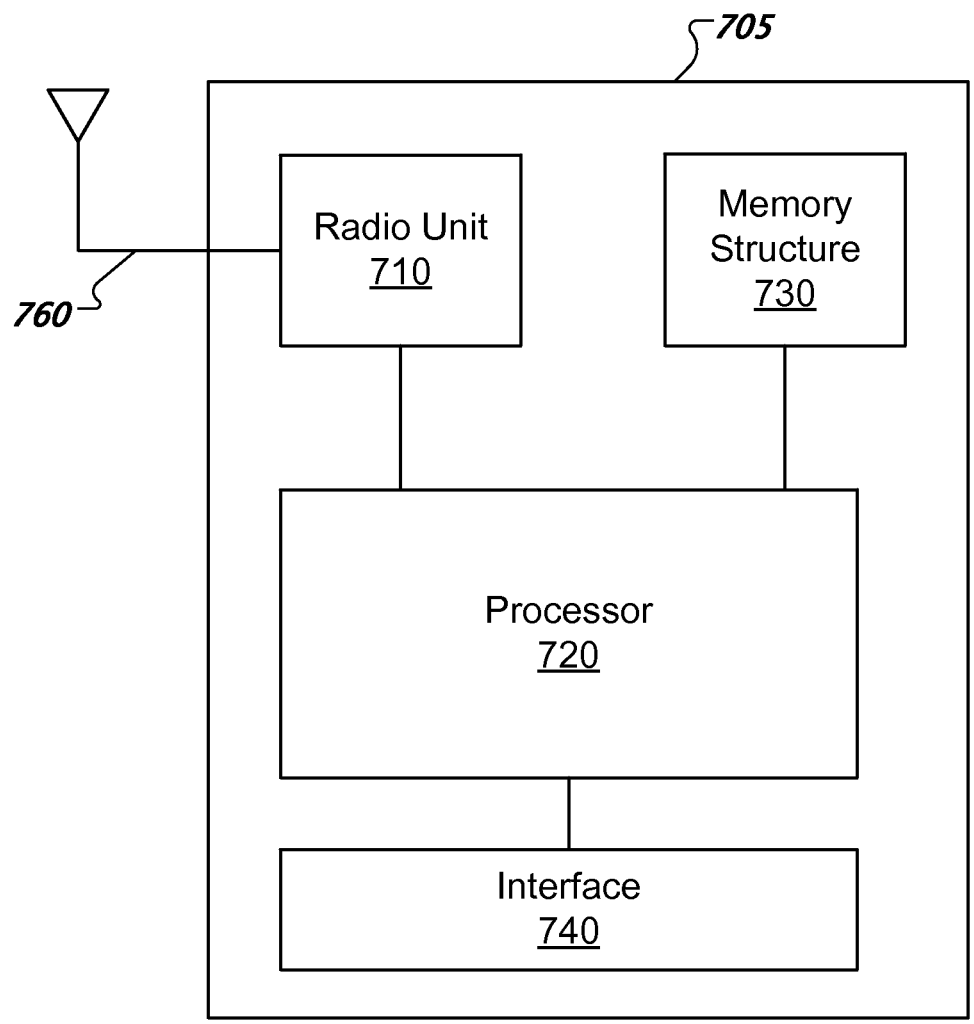
FIG. 7 shows a simplified architecture of an example of a device that is configured for adaptive automatic acknowledgments.

FIG. 7 shows a simplified architecture of an example of a device 705 that is configured for adaptive automatic acknowledgments. The device 705 can include a radio unit 710, processor 720, memory structure 730, and interface 740. The processor 720 can be configured to operate the radio unit 710. The radio unit 110 can be configured to transmit and receive signals via one or more antennas 760. In some implementations, the processor 720 can be configured to perform PHY layer processing. The processor 720 can be configured to perform an adaptive automatic acknowledgment process such as one described herein. In some implementations, the processor 720 can be coupled with an external processor via interface 740, where the external processor performs MAC layer processing. The memory structure 730 can include communication parameters, mode indicators, or both. In some implementations, the interface 740 can provide access to the memory structure 730 such that an external processor can write one or more communication parameters or one or more indicators to the memory structure 730.

Particular embodiments of the technology described in this document can be implemented so as to realize one or more of the following advantages. One or more described technologies can enable manufacturing of a transceiver with flexible acknowledgment settings such that it is suitable for use with any of several wireless communication protocols or communication options within a protocol. Baseband processing of received frames and subsequent generation of acknowledgments can result in generating and transmitting acknowledgments faster and can alleviate higher layers from having to generate acknowledgments.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus comprising:
 a memory structure configured to store a data rate adaptation mode indicator, a frame check sequence adaptation mode indicator, a preset data rate parameter, and a preset frame check sequence parameter;
 an extractor configured to (i) extract a data rate parameter from a received frame to produce an extracted data rate parameter and (ii) extract a frame check sequence parameter from the received frame to produce an extracted frame check sequence parameter;
 a selector configured to (i) select between the preset data rate parameter and the extracted data rate parameter based on the data rate adaptation mode indicator to produce a selected data rate parameter and (ii) select between the preset frame check sequence parameter and the extracted frame check sequence parameter based on the frame check sequence adaptation mode indicator to produce a selected frame check sequence parameter; and
 a generator configured to generate an acknowledgment to the received frame based on the selected data rate parameter and the selected frame check sequence parameter.

2. The apparatus of claim 1, comprising:
 a frame validator configured to validate the received frame based on a frame check sequence included in the received frame, wherein the generator is configured to generate the acknowledgment based on a successful validation of the received frame.

3. The apparatus of claim 1, wherein the memory structure is configured to store an automatic acknowledgment mode indicator configured to enable or disable an automatic acknowledgment mode, and wherein the generator is configured to generate the acknowledgment if the automatic acknowledgment mode is enabled.

4. The apparatus of claim 1, comprising:
 an interface to couple with a controller configured to perform processing for a medium access control (MAC) layer, wherein the generator is configured to generate the acknowledgment independently from the MAC layer.

5. The apparatus of claim 1, wherein the preset data rate parameter comprises a plurality of parameters.

6. The apparatus of claim 1, wherein the preset data rate parameter comprises a modulation and coding scheme (MCS) index value.

7. The apparatus of claim 1, wherein the extracted data rate parameter is based on a modulation and coding scheme (MCS) index value included in the received frame.

8. A system comprising:
 a radio unit comprising a receiver and a transmitter, wherein the receiver is configured to produce a received frame from one or more signals;
 a memory structure storing a data rate adaptation mode indicator, a frame check sequence adaptation mode indicator, a preset data rate parameter, and a preset frame check sequence parameter; and
 a baseband unit configured to (i) extract a data rate parameter from a received frame to produce an extracted data rate parameter and (ii) extract a frame check sequence parameter from the received frame to produce an extracted frame check sequence parameter, wherein the baseband unit is configured to (i) select between the preset data rate parameter and the extracted data rate parameter based on the data rate adaptation mode indicator to produce a selected data rate parameter and (ii) select between the preset frame check sequence parameter and the extracted frame check sequence parameter based on the frame check sequence adaptation mode indicator to produce a selected frame check sequence parameter, and
 wherein the baseband unit is configured to generate an acknowledgment to the received frame based on the selected data rate parameter and the selected frame check sequence parameter, and wherein the transmitter is configured to transmit the acknowledgment.

9. The system of claim 8, wherein the baseband unit is configured to validate the received frame based on a frame check sequence included in the received frame, wherein the baseband unit is configured to generate the acknowledgment based on a successful validation of the received frame.

10. The system of claim 8, wherein the memory structure is configured to store an automatic acknowledgment mode indicator configured to enable or disable an automatic acknowledgment mode, and wherein the baseband unit is configured to generate the acknowledgment if the automatic acknowledgment mode is enabled.

11. The system of claim 8, comprising:
a controller configured to perform processing for a medium access control (MAC) layer, wherein the baseband unit is configured to generate the acknowledgment independently from the MAC layer.

12. The system of claim 8, wherein the preset data rate parameter comprises a plurality of parameters.

13. The system of claim 8, wherein the preset data rate parameter comprises a modulation and coding scheme (MCS) index value.

14. The system of claim 8, wherein the extracted data rate parameter is based on a modulation and coding scheme (MCS) index value included in the received frame.

15. A method comprising:
receiving a frame over a wireless communication channel from a device;
extracting a data rate parameter from the received frame;
extracting a frame check sequence parameter from the received frame;
selecting between a preset data rate parameter and the extracted data rate parameter based on a data rate adaptation mode indicator to produce a selected data rate parameter;
selecting between a preset frame check sequence parameter and the extracted frame check sequence parameter based on a frame check sequence adaptation mode indicator to produce a selected frame check sequence parameter;
selectively generating an acknowledgment to the received frame based on the selected data rate parameter and the selected frame check sequence parameter; and
transmitting the acknowledgment to the device.

16. The method of claim 15, comprising:
validating the received frame based on a frame check sequence included in the received frame, wherein generating the acknowledgment is based on a successful validation of the received frame.

17. The method of claim 15, comprising:
accessing an automatic acknowledgment mode indicator configured to enable or disable an automatic acknowledgment mode, wherein generating the acknowledgement acknowledgment comprising generating the acknowledgment in response to determining that the automatic acknowledgment mode is enabled.

18. The method of claim 15, comprising:
forwarding a version of the received frame to a medium access control (MAC) layer, wherein generating the acknowledgment comprises generating the acknowledgment independently from the MAC layer.

19. The method of claim 15, wherein the preset data rate parameter comprises a plurality of parameters.

20. The method of claim 15, wherein the preset data rate parameter comprises a modulation and coding scheme (MCS) index value, and wherein the extracted data rate parameter is based on a MCS index value included in the received frame.

* * * * *